United States Patent [19]
Auzary et al.

[11] 3,950,629
[45] Apr. 13, 1976

[54] ELECTRICAL ARC-WELDING TORCHES

[75] Inventors: Louis Auzary, Paris; Léon Pluta, Bessancourt; Maurice Pourrat, Parmain, all of France

[73] Assignee: La Soudure Autogene Francaise, Paris, France

[22] Filed: Sept. 13, 1974

[21] Appl. No.: 505,687

[30] Foreign Application Priority Data
Sept. 18, 1973 France .............................. 73.33419

[52] U.S. Cl. .................................. 219/75; 219/122
[51] Int. Cl.² .......................................... B23K 9/16
[58] Field of Search ............. 219/74, 75, 121 P, 122

[56] References Cited
UNITED STATES PATENTS

| | | | |
|---|---|---|---|
| 1,638,336 | 8/1927 | Himes.............................. | 219/122 X |
| 2,761,049 | 8/1956 | McElrath et al.................. | 219/75 X |
| 2,798,145 | 7/1957 | Vogel................................ | 219/75 |
| 3,692,973 | 9/1972 | Oku et al.......................... | 219/75 X |

*Primary Examiner*—Bruce A. Reynolds
*Assistant Examiner*—D. A. Tone
*Attorney, Agent, or Firm*—Lee C. Robinson, Jr.

[57] ABSTRACT

This invention relates to welding torches of the kind comprising a torch body which incorporates a tubular core having means of clamping a refractory electrode which projects beyond the torch body, flow-means for an arc-gas, which flow-means consists of an annular passage between the electrode and an axial flow-controlling sleeve which is arranged about said electrode and co-axially therewith, and means for circulating water to cool the torch body; and a nozzle for shielding the gas surrounding the torch body with a gap therebetween. Such torches are referred to in the industry as "TIG" torches. In such a torch the invention consists in a combination of several features viz:
  a. the axial length of the annular passage is at least 10mm. and its radial width is between 0.5 and 3 mm. for an axial distance of at least 5 mm. from its upstream end;
  b. the annular passage is connected upstream to a chamber for distributing the arc-gas and
  c. water circulating means in the immediate vicinity of the arc-gas distribution chamber and in thermal contact with the flow-controlling sleeve and with the means for clamping the electrode, via the tubular core, are also provided.

15 Claims, 8 Drawing Figures

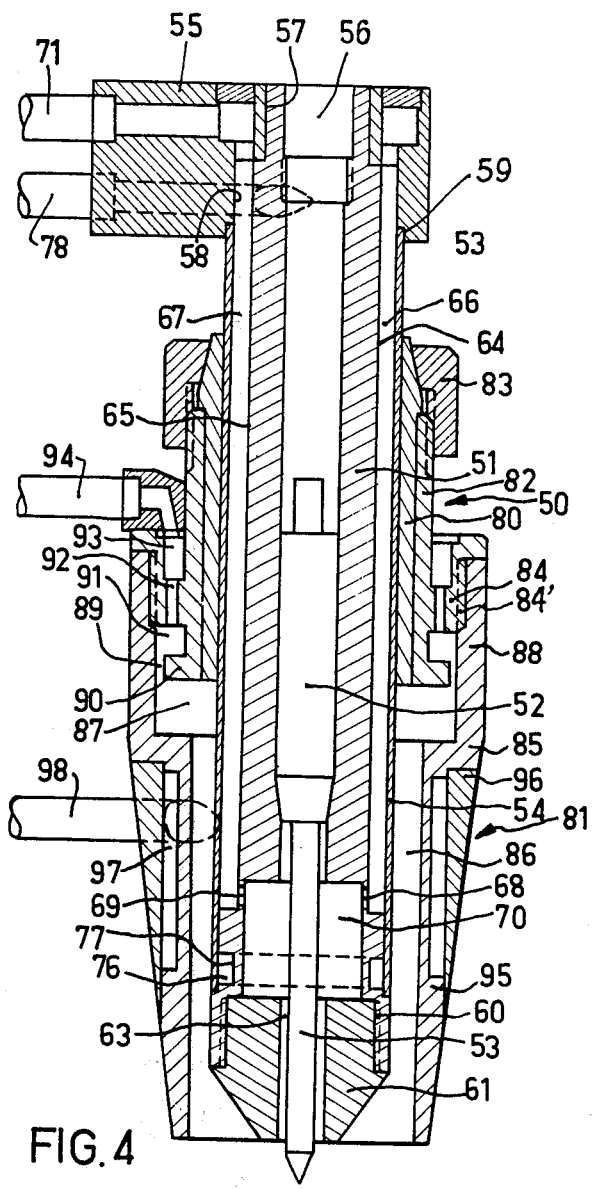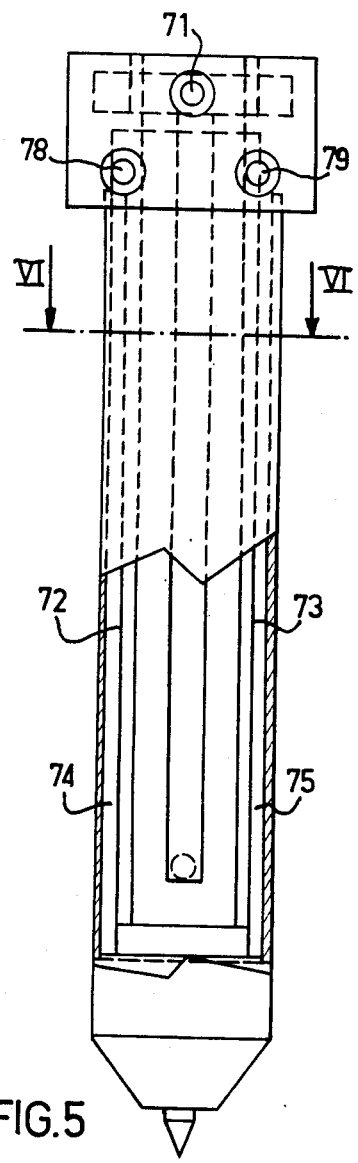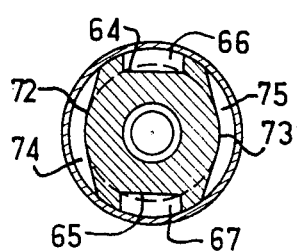
FIG. 4
FIG. 5
FIG. 6

ELECTRICAL ARC-WELDING TORCHES

BACKGROUND OF THE INVENTION

The present invention relates to torches for electrical arc-welding in an atmosphere.

In the prior art, electrical arc-welding is performed either by striking an electrical arc in a normally inert shielding atmosphere between an electrode and the parts to be joined (the process being termed "TIG" (tungsten inert gas) or "MIG" (metal inert gas) depending on whether the electrode used is refractory or meltable) or by striking an electric arc between an electrode situated in a chamber and the parts to be joined, the chamber communicating with a passage through which the arc and a gas known as the plasma generating gas enter the chamber and from which they emerge to form the atmosphere for the arc. In this latter process, known as the "plasma" process, the wall of the chamber is formed by a part known as the "nozzle" which is vigorously cooled, generally by water circulating within it. The arc is severely constricted as a result of passing through the passage in the nozzle.

Both of these processes have drawbacks. The TIG or MIG process gives an arc the ends of which are unstable, both at the electrode and at the parts to be joined, with the result that the melted area on the parts to be joined becomes wider. In fact, with this process it is not possible to weld sheet metal thicker than 3mm in a single pass due to the fact that above a certain limit increasing the power of the torch results only in an enlargement of the melted area with practically no increase in penetration. What is more this process usually calls for a support at the back, on account of the fact that the melted area, being wide, needs to be supported.

The process in which a plasma arc is severly constricted by the passage in the nozzle and by a flow of gas which travels through this same passage at high speed allows a good, steady arc to be provided and considerable power to be transmitted, this power depending both on the welding current and on the throughput of plasma generating gas. It is easy to see that the plasma arc, due to the high energy density supplied and the high exit velocity of the gas, is particularly useful for cutting techniques; however, for this very reason it is more difficult to use for welding although it can be employed by using the so-called keyhole technique which consists in making a hole in the parts to be welded at right angles to the arc and in shifting this hole along with the arc, the hole closing up again at the rear by capillary action and thus forming the joint between the two parts. This method allows sheet metal up to 7mm thick to be welded and, in an improvement recently developed, the arc is constricted not by mechanical means by making it travel along a passage, but by pneumatic means by causing the pointed end of the electrode to extend beyond the neck of a passage which converges and then diverges and by bringing about the constriction solely as a result of the action of the jet of plasma generating gas. Generally speaking, the nozzle is liable to deteriorate as a result of secondary arcs; it needs to be cooled vigorously, generally by water circulating within it, so that, particularly when the arc is constricted by a passage through its nozzle, the nozzle will serve as the means to dissipate a considerable flow of heat. Furthermore, the structure of the torch itself is far more complicated, as also is the way in which it is supplied with electricity since on the one hand a high frequency supply is required to strike the arc and on the other hand the conditions which allow welding are set up in two stages, firstly by striking a so-called "pilot arc" between the electrode and the nozzle, with the nozzle serving as the anode, and then by transferring this arc to the parts to be welded so that the welding operation may begin, the nozzle being now electrically isolated.

It is an object of the invention to increase performance with the so-called "TIG" welding process while retaining the simple design of welding heads which employ this process.

SUMMARY OF THE INVENTION

In a welding torch comprising a torch body which incorporates, in a tubular core, a means of clamping a refractory electrode which projects beyond said torch body, flow means for an arc gas which consist of a narrow annular passage between said electrode and an axial flow-controlling sleeve which is arranged around said electrode co-axially therewith, means for circulating water to cool said torch body, with a nozzle for shielding gas surrounding the torch body at a distance, the axial length of said annular passage being at least 10 millimetres and its radial width being between 0.5 and 3 millimetres, and preferably between 0.5 and 1.5 millimetres, for an axial distance of at least 5 millimetres from its upstream end; said annular passage for the arc gas being connected upstream to a distribution chamber for the arc-gas; and said means for circulating cooling water being situated in the immediate vicinity of said arc-gas distribution chamber and being in thermal contact with said flow-controlling sleeve and the said means for clamping the electrode, via said tubular core.

It is these features as a whole which enable both the simple structure of "TIG" welding torches to be retained and the stability and penetration of the arc to be considerably improved. The latter, notable result is due to the action of a flow of arc-gas which is formed into a thin layer under favourable thermal conditions, i.e. with good cooling.

The cooling means comprise longitudinal inlet and return passages to admit and remove water which are defined by longitudinal grooves or millings in the core of the torch and by a surrounding skirt, the said passages leading to a transverse ring-shaped channel which is situated in the immediate vicinity of the distribution chamber and is in thermal contact with the jet sleeve.

The object of this arrangement is to increase, as far as possible, the surfaces for heat-exchange between the cooling fluid and the torch body and particularly to give cooling to the arc gas as soon as it is introduced.

When spot-welding sheets lying on top of one another in atmosphere, the body of the torch is provided with an extension which ends downstream of the end of the sleeve and which has apertures to release the gases. This extension isolates the working area from the surrounding atmosphere since the end of it rests directly against the sheet during welding.

BRIEF SUMMARY OF THE DRAWINGS

Other features and advantages of the invention will be apparent from the following description which is given by way of example, referring to the accompanying drawings in which:

FIG. 4 is an axial cross-section of a modified embodiment of the torch according to the invention with certain parts shown in elevation, FIG. 5 is a view partly in elevation and partly broken away of the same torch, with the view being taken at 90° to that of FIG. 4, FIG. 6 is a cross-section along line VI—VI of FIG. 5.

DETAILED DESCRIPTION OF PREFERRED EMBODIMENTS

Figure 1:
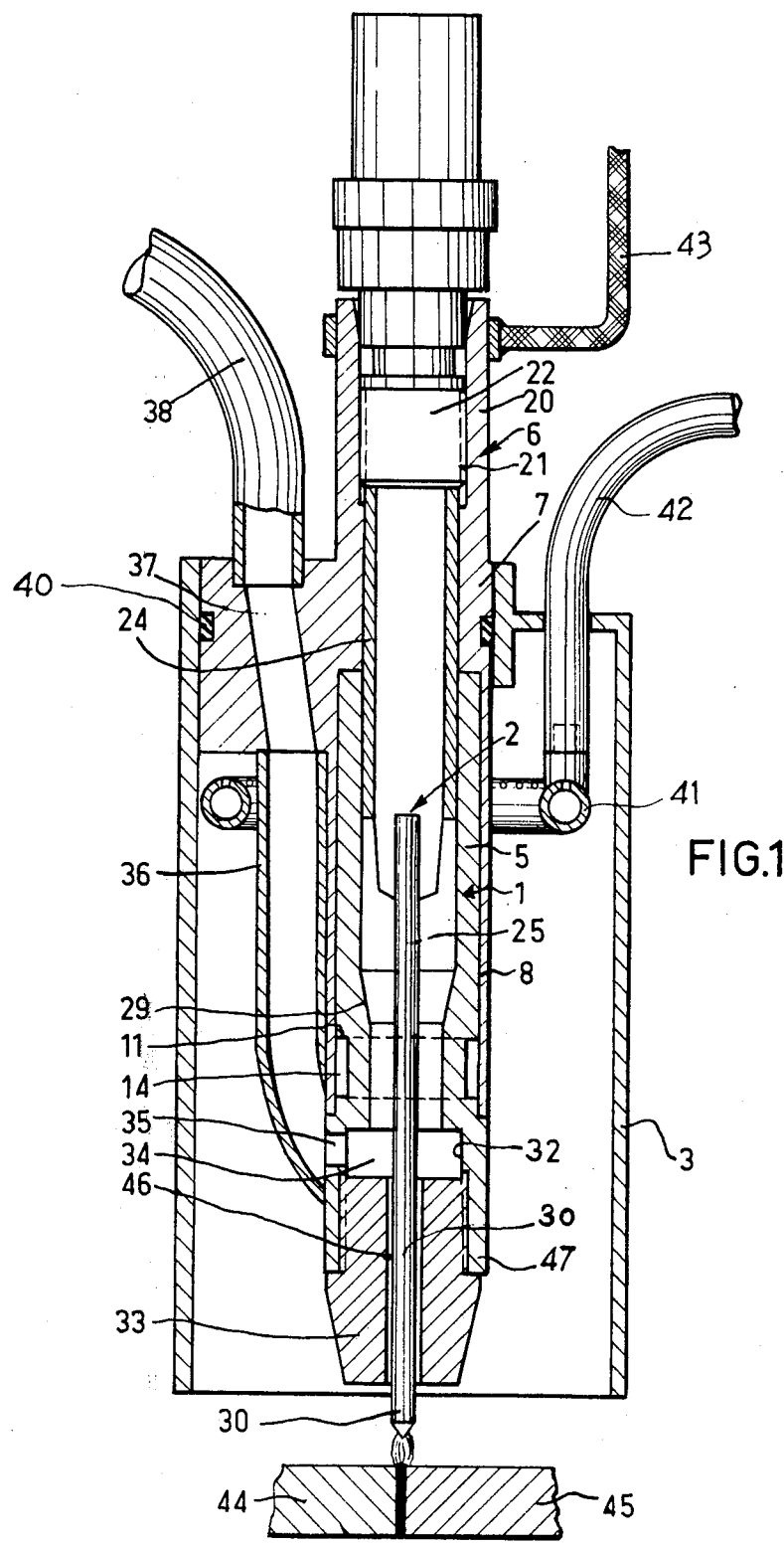
FIG. 1 is an axial cross-section of a torch according to the invention.
Figure 2:
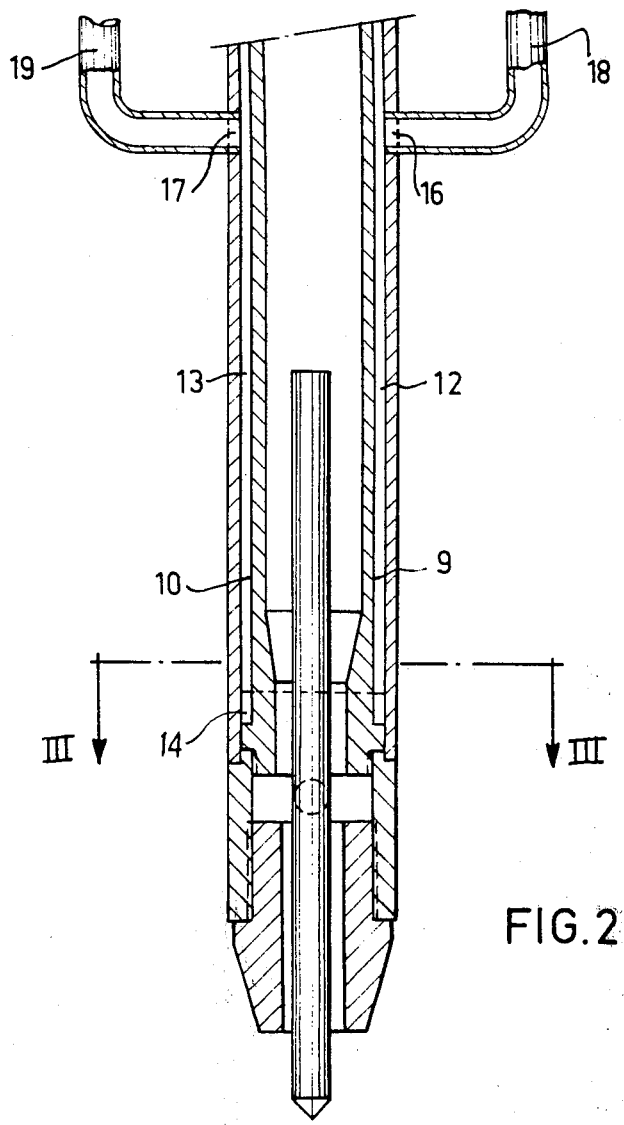
FIG. 2 is an axial cross-section of the torch of FIG. 1, with the plane of section at 90° to that of FIG. 1.
Figure 3:
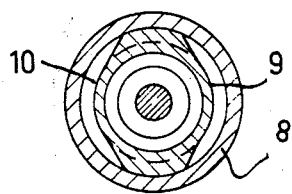
FIG. 3 is a cross-section along line III—III of FIG. 2.

Referring to FIGS. 1 to 3, a welding torch has a torch body 1 in which is situated an electrode carrier 2 and around which is attached a nozzle 3 for shielding gas.

The torch body 1 is formed by a tubular core 5 part of which fits into and is held in position in a torch support 6. The torch support 6 has, on one side of a central area 7, a portion in the form of a cylindrical skirt 8 which fits over and makes contact with the tubular core 5 of the torch body 1. On the outside this tubular core 5 has two diametrically opposed longitudinal millings 9 and 10 (FIG. 2) which, on the downstream side with reference to a direction from the electrode to the parts to be welded, lead to an annular recess 11, thus forming an inlet passage 12 and a return passage 13 for a cooling fluid, which is generally water, these passages 12 and 13 being connected by a transverse annular passage 14 which is formed by the recess 11 and the inside wall of the skirt 8. At one end, passages 12 and 13 are connected, by openings 16 and 17 respectively, to inlet and return tubes 18 and 19 for the cooling fluid.

On the other, or upstream, side (the term "upstream" is used when referring to a part or structure which is axially remote from the outlet from the torch) of the central area 7, the torch support 6 extends into a cylindrical sleeve 20 which contains a thread 21 into which a threaded part 22 screws against the electrode support 2. The electrode support 2 has an elongated body 24 which terminates in a divided end-piece 25 which bears against a tapering bearing face 29 presented by the inside wall of the tubular core 5 of the torch body 1. In this way it is possible to lock the electrode 30 in the required axial position simply by acting on the electrode support 2.

On the downstream side, the tubular core 5 continues past the annular recess 11 to form a wide opening 32 into which a sleeve 33 for controlling the flow of arc-gas screws. The sleeve leaves a chamber 34 which, via a lateral opening 35, is connected to a supply pipe 36 for arc-gas which is brazed onto the skirt 8 and which leads at one end to a passage 37 which passes entirely through the central area 7 of the torch support 6 and which is connected to a gas source (not shown) by a duct 38.

The nozzle 3 for the shielding gas is wide-mouthed and is connected to the central area 7 of the torch body 1 by a joint 40. An inlet duct 42 for shielding gas opens into this skirt-like nozzle 3 through a ring 41 which has openings pointing in the upstream direction.

The choice of the materials used to form certain parts of the torch is of vital importance: it is advisable for the arc-gas controlling sleeve 33 to be vigorously cooled and to this end both it and the core 5 of the torch body are formed from a material which is a good conductor of heat, such as copper or tellurium-copper. The electrode on the other hand is refractory in this instance and is made of tungsten. It is connected to an electrical source capable of supplying a current of 400 to 500 amperes by a cable 43 which is connected to the torch support 2.

The torch operates as follows. The arc forms between the pointed end of the electrode 30 and the parts 44, 45 to be welded, while a flow of gas is set up in duct 38, 37, 36, passes through opening 35 and spreads through supply chamber 34 and from there becomes shaped into a layer in the passage 46 between electrode 30 and flow-controlling sleeve 33. In this area the flowing gas layer is subject to laminar flow which results on the one hand from the substantially annular structural configuration of the passage and on the other hand, and particularly, from the favourable thermal conditions which are the result of the vigorous cooling brought about successively by passage 36 where it is in contact with skirt 8 (which latter defines the cooling passages 12 and 13), by the opening 32 which forms chamber 34 and is in the immediate vicinity of the annular cooling passage 14, and especially by the flow-controlling sleeve 33, this sleeve being itself cooled as a result of thermal conductivity through the end portion 47 of core 5, which extends down from cooling passage 14. Thus, the arrangement described is doubly advantageous; on the one hand it is only necessary to look at the structure to see that it is particularly simple; its design makes it easy to produce and this is reflected in its manufacturing cost and the speed with which it can be repaired. On the other hand, the fact of the longitudinal cooling passages 12 and 13, and the transverse passage 14 for cooling the supply chamber 34 and the flow-controlling sleeve 33 being arranged in succession in the downstream direction makes it possible, by arranging them as close together as possible, to provide the arc gas with the requisite cooling, or at least to restrict considerably the temperature to which it has risen when it leaves the controlling sleeve 33.

The role of the gas layer is a very special one: it encloses the arc without penetrating into it. In a torch according to the invention the arc is guided at the sides by the annular jet of arc-gas; the instability on the part of the arc which is the major drawback with "TIG" welding is reduced and the arc forms in a particularly settled way between its point of origin near the end of the electrode 30 and the parts 44, 45 to be welded. Due to the stability of the arc, performance is considerably enhanced in comparison with a conventional "TIG" arc. The thickness of metal which can be welded in one pass is as much as 8 millimetres with sheets of stainless steel, which is substantially twice what can normally be achieved. Although the welding arc according to the invention is to a certain extent directional, it is very far from as straight and directional as a mechanically constricted plasma arc.

The circuit 3, 41, 42 for shielding gas is used to protect the welding area and the arc against the oxidising atmosphere and for this purpose argon or a mixture of argon and hydrogen or other suitable gases is used.

Experience has shown that the steadiness of the arc is a function of the gas flow in the vicinity of the welding electrode 30 and of the welding current intensity employed.

As a first approximation, it may be assumed that the increase in the steadiness of the arc is chiefly a result of the relative positions of the cooling circuit (annular passage 14), of the circuit for the gas for the torch (passage 46), of the taper 29 for clamping the electrode, and of the part 33 for controlling the arc-gas.

The apparatus in FIGS. 1 to 3 allows sheets of the order of 8 mm thickness to be butt-welded and in particular sheets of alloy-steel of the nickel-chrome type, using filler metal, and it gives narrower weld beads than does the conventional TIG process because of the narrowness of the arc. A further reason why such a performance is possible is that current intensities up to 400 to 450 Amps can be used, whereas when intensity is increased with the conventional TIG process all that is caused is an enlargement in the melt pool. What is more, these results are achieved with a torch of simple design, in contrast to plasma torches which on the one hand are more complex in structure and on the other hand call for supply apparatus which is complex also.

Welding is carried out using normal "TIG" techniques but it can also be carried out with the "keyhole" technique used in plasma welding in which a hole is made at right angles to the torch which then closes up on its own by capillary action. If the electrode is suitably positioned this technique can be used with high power levels.

The throughput of arc-gas in the apparatus according to the invention is from 2 to 8 litres/min. and more particularly 2½ to 5 litres/min. and is preferably 5 litres/min. It should also be noted that the throughput of gas is of practically no significance as a welding parameter in the apparatus according to the invention and that only the nature of the gas need be considered, whereas in conventional plasma welding the throughput of gas is an important parameter given that the energy supplied by the arc is produced in it by the welding current and the gas itself as it breaks down in the arc plasma. The electrode 30 extends beyond the downstream end of sleeve 30 by 3 to 15 mm. As an application this type of welding may be used with a so-called "multi-electrode" welding head which employs a number of torches arranged one after another. It was seen above that the length of the arc-gas passage 46 was to be at least 5 mm and its radial width preferably a ½ to 1½ mm. It is advantageous to make this passage in the form of a cylinder of constant radial width and when this is so it has a preferred axial length of at least 10 mm. Similarly, it has proved particularly suitable for the radial width of passage 46 to remain between ¾ millimeter and 1 millimeter.

Referring to FIGS. 4 to 6, a torch 50 according to the invention comprises a tubular core 51 which incorporates means 52 for clamping an axial electrode 53. The tubular core 51 is enclosed in a skirt 54. A supply block 55 contains an opening 56 which has a narrowed portion 57 into which fits the upstream end of the tubular core 51, and a wider portion 58 which has a shoulder 59 into which fits the skirt 54. At the downstream end skirt 54 has an internally threaded portion 60 into which screws a flow-controlling sleeve 61 which forms the annular passage 63 for the arc gas.

On the outside, the tubular core 51 has two diametrically opposed longitudinal millings 64 and 65 which, in conjunction with the skirt 54, form channels 66 and 67 which, at their downstream ends, open via openings 68 and 69 into an arc-gas distribution chamber 70 which in turn supplies the annular passage 63. Upstream, channels 66 and 67 are connected to a supply passage 71 for the arc-gas.

The tubular core 51 also has on the outside two other angularly widened milled areas 72 and 73 which, in conjunction with skirt 54, form two wide and shallow channels 74 and 75 which open at the downstream end into a transverse annular passage 76 formed by an annular milling 77 in the core 51 which is situated in the immediate vicinity of the flow-controlling sleeve 61. Channel 74 is connected to a water inlet tube 78, while channel 75 is connected to a water outlet tube 79.

Around skirt 54 is mounted, via an isolating spacer sleeve 80, a shielding-gas nozzle which is formed by a support sleeve 82 which is secured by a nut 83 to the spacer sleeve 80. Onto an external threaded bearing face 84' of a shoulder 84 on the support sleeve 82 is screwed the skirt body 85, and with the skirt 54 the latter forms an annular passage 86 for the shielding gas. Upstream, this annular passage 86 communicates with a distribution chamber 87 which is formed in a widened part 88 of the skirt body 85. This distribution chamber 87 in turn communicates, via an annular axial gap 89 formed by a collar 90 on the support sleeve 82, with a pre-distribution chamber 91 which is supplied by a plurality of openings 92 formed in the shoulder 84. These openings 92 are themselves fed from a main distribution gallery 93 which communicates with a supply tube 94 for the shielding gas.

Between the widened portion 88 and a bearing area 95 on the skirt body 85 is mounted an annulus 96 which, in conjunction with the skirt body 85, forms an annular passage 97 for cooling water which is admitted through an inlet tube 98 for water to the nozzle and removed through an outlet tube.

The way in which this embodiment operates need not be described in detail since it is substantially the same as that of the torch described above and all that will be done is to point out the function of special constructional features:

The first point to be noted is that the arc gas is admitted axially in practically direct contact with the torch core 51. The chief advantage of this arrangement, apart from its constructional simplicity, is that it increases heat exchange with the cooling water circulating in channels 74 and 75, this exchange taking place as a result of thermal conductivity via the torch core 51. The exchange is also assisted by the shallow shape of the channels 74 and 75 which makes it possible to increase the area of contact between the arc gas and the core 51. The cooling of the arc-gas continues at a point where the arc-gas distribution chamber is situated, the gas being vigorously cooled by the transverse water-circulation passage 76. It can be seen that this annular passage 76 for cooling water is in the immediate vicinity both of the distribution chamber 70 and of the controlling sleeve 61, so that the latter, which is likewise made from a material which is a good conductor of heat, is itself very efficiently cooled and plays a part in preventing any excessive rise in temperature of the arc gas as it flows through the annular arc-gas passage 63. Experience has fully confirmed the overriding importance of avoiding at all costs any excessive heating up of the arc-gas, which would severely upset the flow of the arc-gas in the annular passage 63 and would cause the torch to operate less satisfactorily.

Another condition which determines whether or not the torch described operates satisfactorily is that the shielding gas should be applied in the form of a layer which flows absolutely homogeneously. This condition is met by taking the many steps which are vital to ensure uniform distribution around the assembly formed by the torch core 51 and the skirt 54. These steps consist in providing a series of distribution chambers 87, 91, 93 which are separated from one another by flow-regularising means (gap 89, openings 92).

The flow of the shielding gas at the outlet from the nozzle is thus such as to form a uniform envelope around the arc, which latter is constricted pneumatically by the arc-gas. In this case too practical experience has shown the importance of uniform flow on the part of the shielding gas and without such a flow a steadied arc cannot be made to operate correctly.

Figure 7:
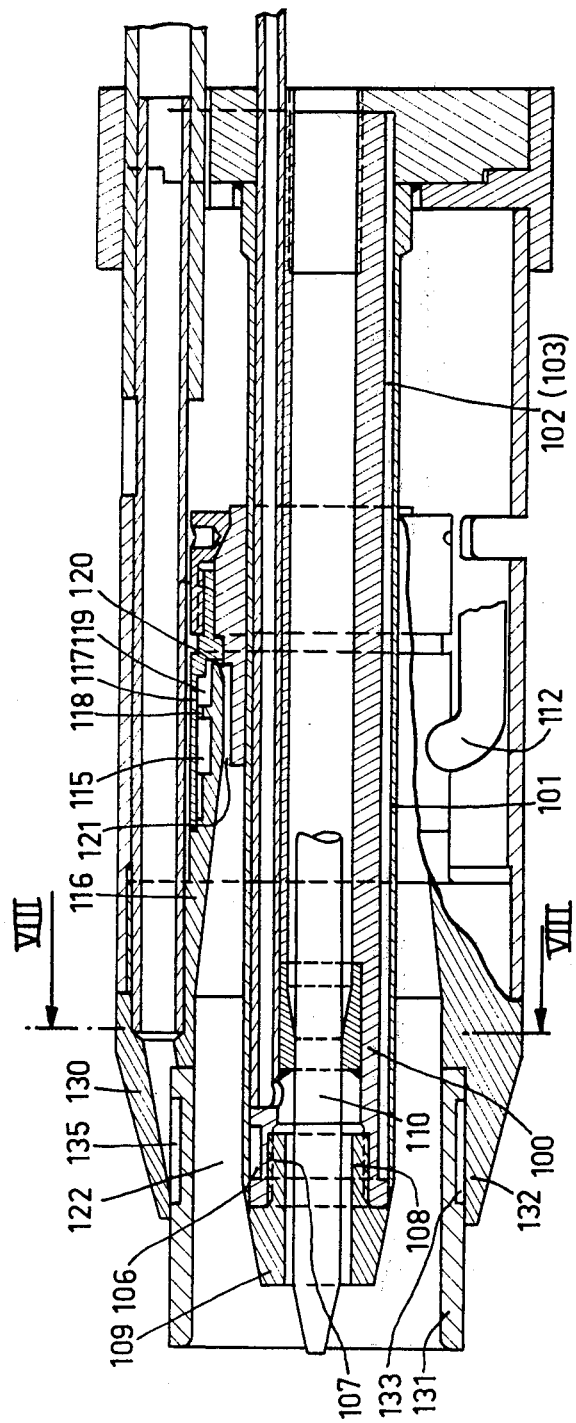
FIG. 7 is a cross-section of another modified embodiment of the torch according to the invention taken generally along line VII—VII of FIG. 8.
Figure 8:
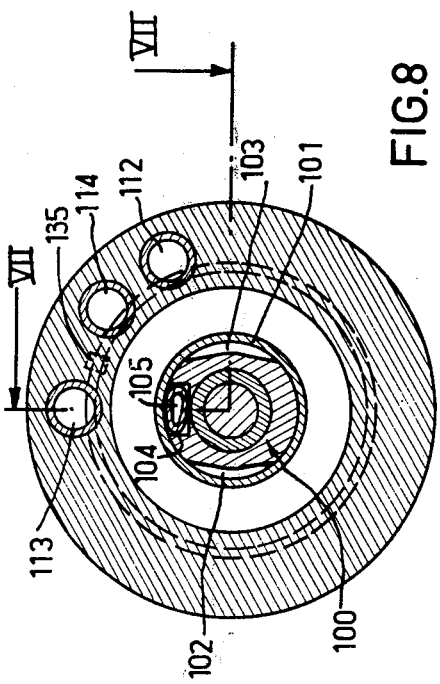
FIG. 8 is a cross-section along line VIII—VIII of FIG. 7.

Reference will now be made to FIGS. 7 and 8 in which it can be seen that a torch body 100, which is enclosed by a skirt 101, once again has shallow channels 102 and 103 for the cooling water and a longitudinal seating 104 into which fits a flattened tube 105 to admit the arc-gas. A particular arrangement made in this torch body is that an annular passage 106 for cooling water, which connects together the water inlet channel 102 and the water outlet channel 103 at the downstream end, is arranged directly against a sidewall 107 of a supporting area 108 of the flow-controlling sleeve 109 thus ensuring that the sleeve 109 is even more efficiently cooled. An arc-gas supply chamber 110 is situated slightly upstream of the annular water passage 106 in this case.

In this instance, the shielding-gas nozzle 130 is formed in a slightly different way in that the passage 112 for admitting shielding gas, the passage 113 for admitting water to cool the nozzle and the passage 114 for removing this water extend longitudinally. The passage 112 for the shielding gas opens into a first annular chamber 115 which is formed between a nozzle skirt 116 and an external annular part 117, and this chamber 115 communicates via openings 118 in the form of grooves with a second distribution chamber 119. It then communicates via a baffle section 120 with an internal distribution chamber 121 which opens into the annular flow space 122 between nozzle 131 and torch core 100. In this instance the downstream end of the nozzle 130 for the shielding gas is made in the form of an end-sleeve 131 for the nozzle which, in conjunction with a nozzle body 132, defines a narrow, axially elongated annular cavity 133. This cavity 133 communicates with water-inlet and outlet tubes 113 and 114 for the nozzle. To ensure that the cooling water circulates peripherally a dividing partition 135 is formed longitudinally in the cavity 133 between passages 113 and 114.

We claim:

1. In a welding torch comprising a torch body which incorporates, in a tubular core a means of clamping a refractory electrode which projects beyond said torch body, flow-means for an arc-gas including a narrow annular passage between the said electrode and an axial flow-controlling sleeve which is arranged about said electrode co-axially therewith, and means for circulating water to cool said torch body, with a nozzle for shielding gas surrounding the torch body at a distance, the invention which comprises the combination of the following features:

a. the axial length of said annular passage is at least ten millimetres, and its radial width is between 0.5 and 3 millimetres, for an axial distance of at least 5 millimetres from its upstream end;
    b. chamber defining means connected to said annular passage for distributing the arc-gas;
    c. said means for circulating cooling water are situated in the immediate vicinity of said chamber defining means and are in thermal contact with said flow-controlling sleeve and with the said means for clamping the electrode.

2. A welding torch according to claim 1, wherein the radial width of said annular passage is between 0.75 and 1 millimetre.

3. A welding torch according to claim 1, wherein the nozzle for the shielding gas contains a shallow annular cavity for the cooling water.

4. In a welding torch, in combination:
    a torch body having a tubular core;
    a refractory electrode projecting from the torch body;
    clamping means within the tubular core for securing the refractory electrode to the torch body;
    a sleeve disposed around the refractory electrode in coaxial relationship therewith, the sleeve being spaced from the electrode to form a narrow annular passage therebetween for laminar flow of arc-gas;
    means for supplying the arc-gas to the annular passage, the torch body including an enlarged chamber connected between the supplying means and the annular passage for evenly distributing the arc-gas in said passage, said enlarged chamber being located downstream of said clamping means for unobstructed communication of arc-gas from said supplying means to said passage; and
    a nozzle for shielding gas disposed around a portion of the torch body in spaced relationship therewith.

5. In a welding torch, in combination:
    a torch body having a tubular core;
    a refractory electrode projecting from the torch body;
    clamping means within the tubular core for securing the refractory electrode to the torch body;
    a sleeve disposed around the refractory electrode in coaxial relationship therewith, the sleeve being spaced from the electrode to form a narrow annular passage therebetween, the axial length of said annular passage being at least 10 millimeters, and its radial width being between 0.5 and 3 millimeters, for an axial distance of at least 5 millimeters from its upstream end;
    means for supplying arc-gas to the annular passage, the torch body including an enlarged chamber connected between the supplying means and the annular passage for evenly distributing the arc-gas in said passage;
    fluid circulating means within the torch body in the immediate vicinity of the enlarged chamber, the fluid circulating means being in thermal contact with the sleeve and the clamping means to cool the same;
    a nozzle for shielding gas disposed around a portion of the torch body in spaced relationship therewith;
    conduit means for providing a supply of shielding gas; and
    means interconnecting the conduit means and the nozzle for admitting shielding gas thereto, said last-mentioned means defining a plurality of series-connected distribution chambers in spaced relationship with each other.

6. In a welding torch, in combination;
a torch body having a tubular core;
a refractory electrode projecting from the torch body;
means within the tubular core for securing the refractory electrode to the torch body;
a sleeve disposed around the refractory electrode in coaxial relationship therewith, the sleeve being spaced from the electrode to form a narrow annular passage therebetween, the annular passage having an axial length of at least 10 millimeters and a radial width of between about 0.5 and 3 millimeters for an axial distance of at least 5 millimeters;
means for supplying arc-gas to the annular passage, the torch body including an enlarged chamber connected between the supplying means and the annular passage for evenly distributing the arc-gas in said passage; and
a nozzle for shielding gas disposed around a portion of the torch body in spaced relationship therewith.

7. In a welding torch, in combination:
a torch body having a tubular core;
a refractory electrode projecting from the torch body;
clamping means within the tubular core for securing the refractory electrode to the torch body;
a sleeve disposed around the refractory electrode in coaxial relationship therewith, the sleeve being spaced from the electrode to form a narrow annular passage therebetween;
means for supplying arc-gas to the annular passage, the torch body including an enlarged chamber connected between the supplying means and the annular passage for evenly distributing the arc-gas in said passage and located downstream of said clamping means for unobstructed communication of arc-gas from said supplying means to said passage;
fluid circulating means within the torch body in the immediate vicinity of the enlarged chamber, the fluid circulating means being in thermal contact with the sleeve and the clamping means to cool the same;
means for supplying cooling fluid to the fluid circulating means; and
a nozzle for shielding gas disposed around a portion of the torch body in spaced relationship therewith.

8. In a welding torch, in combination:
a generally cylindrical torch body having a tubular core and a pair of longitudinally extending grooves;
a refractory electrode projecting from the torch body;
clamping means within the tubular core for clamping the refractory electrode to the torch body;
a sleeve disposed around the refractory electrode in coaxial relationship therewith, the sleeve being spaced from the electrode to form a narrow annular passage therebetween;
means for supplying arc-gas to the annular passage, the torch body including an enlarged chamber located downstream of said clamping means and connected between the supplying means and the annular passage to permit the unobstructed flow of arc-gas from the supplying means to said passage and for evenly distributing the arc-gas in said passage;
fluid circulating means within the torch body in the immediate vicinity of the enlarged chamber, the fluid circulating means being in thermal contact with the sleeve and the clamping means to cool the same and including a transverse annular channel adjacent said chamber;
means for supplying cooling fluid to the fluid circulating means, the fluid supply means having a skirt member cooperating with the longitudinally extending grooves in the torch body to form inlet and outlet channels communicating with said annular channel; and
a nozzle for shielding gas disposed around a portion of the torch body in spaced relationship therewith.

9. In a welding torch as defined in claim 8, said inlet channel being in thermal contact with said means for supplying arc-gas to the annular passage.

10. In a welding torch as defined in claim 9, said means for supplying arc-gas to the annular passage comprising longitudinal channels milled into said tubular core.

11. In a welding torch as defined in claim 8, said longitudinally extending grooves being of shallow rectangular cross-section.

12. In a welding torch as defined in claim 8, said transverse annular channel being axially disposed adjacent to and upstream of said enlarged chamber so as to be separated from said sleeve by said enlarged chamber.

13. In a welding torch as defined in claim 8, said transverse annular channel being axially disposed about the periphery of said enlarged chamber.

14. In a welding torch as defined in claim 8, said transverse annular channel being axially disposed adjacent said enlarged chamber and about the periphery of said sleeve.

15. In a welding torch, in combination:
a generally cylindrical torch body having a tubular core;
a refractory electrode projecting from the torch body;
means within the tubular core for clamping the refractory electrode to the torch body;
a sleeve disposed around the refractory electrode in coaxial relationship therewith, the sleeve being spaced from the electrode to form a narrow annular passage therebetween, the annular passage having an axial length of at least 10 millimeters and a radial width of between about 0.5 and 3 millimeters for an axial distance of at least 5 millimeters;
means for supplying arc-gas to the annular passage, the torch body including an enlarged chamber connected between the supplying means and the annular passage for evenly distributing the arc-gas in said passage;
fluid circulating means within the torch body in the immediate vicinity of the enlarged chamber;
means for supplying cooling fluid to the fluid circulating means, the fluid circulating means being in thermal contact with the sleeve and the clamping means to cool the same; and
a nozzle for shielding gas disposed around a portion of the torch body in spaced relationship therewith.

* * * * *